(12) United States Patent
Caviedes et al.

(10) Patent No.: US 9,641,800 B2
(45) Date of Patent: May 2, 2017

(54) METHOD AND APPARATUS TO PRESENT THREE-DIMENSIONAL VIDEO ON A TWO-DIMENSIONAL DISPLAY DRIVEN BY USER INTERACTION

(71) Applicant: INTEL CORPORATION, Santa Clara, CA (US)

(72) Inventors: Jorge E. Caviedes, Mesa, AZ (US); Sin Lin Wu, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 14/725,777

(22) Filed: May 29, 2015

(65) Prior Publication Data

US 2016/0353058 A1 Dec. 1, 2016

(51) Int. Cl.
*H04N 7/14* (2006.01)
*H04N 7/15* (2006.01)
*H04N 13/04* (2006.01)

(52) U.S. Cl.
CPC ............. *H04N 7/15* (2013.01); *H04N 7/142* (2013.01); *H04N 13/0445* (2013.01); *H04N 13/0481* (2013.01); *H04N 13/0484* (2013.01); *H04N 2007/145* (2013.01)

(58) Field of Classification Search
CPC ........... H04N 13/0445; H04N 13/0481; H04N 13/0484; H04N 2207/145

USPC ............................................ 348/14.01–14.16
See application file for complete search history.

(56) References Cited

U.S. PATENT DOCUMENTS

| | | | | |
|---|---|---|---|---|
| 7,626,569 B2* | 12/2009 | Lanier | .................... | G06F 1/1601 345/156 |
| 7,907,774 B2* | 3/2011 | Parr | .................... | G06K 9/00201 345/419 |
| 8,587,635 B2* | 11/2013 | Hines | ....................... | H04N 7/14 348/14.07 |
| 8,593,574 B2* | 11/2013 | Ansari | .................... | H04N 13/00 348/558 |
| 8,659,592 B2* | 2/2014 | Wang | ..................... | G06T 7/0081 345/419 |
| 8,928,659 B2* | 1/2015 | Bar-Zeev | ................ | G06T 15/20 345/158 |
| 2011/0254914 A1* | 10/2011 | Ng | ................... | H04N 21/42202 348/14.16 |

* cited by examiner

*Primary Examiner* — Hemant Patel (57) ABSTRACT

Three-dimensional video is presented on a two-dimensional display. The view of the video is driven by user interaction. In one example, a two-dimensional (2D) video sequence in real time with a first view is synthesized from a video image sequence with depth captured by a first device. The 2D video sequence with the first view is provided to a second device in real time. A command is received from the second device to change a view of the 2D video sequence as the video sequence is rendered. The view of the 2D video sequence is changed as it is rendered to a 2D video sequence with a second view, and the 2D video sequence with the second view is provided to the second device in real time.

20 Claims, 8 Drawing Sheets

METHOD AND APPARATUS TO PRESENT THREE-DIMENSIONAL VIDEO ON A TWO-DIMENSIONAL DISPLAY DRIVEN BY USER INTERACTION

FIELD

The present description relates to rendering three-dimensional video views received from a remote camera system driven by user interaction.

BACKGROUND

Video conferencing and telepresence systems are available on many different devices and systems. Large room fixed systems with multiple cameras and large screens present a more immersive experience. However, many more conferences are conducted using desktop and portable systems that can be set up in any space. With the advent of higher data rates over cellular radio communications systems, smart phones and tablets have become pervasive video and telepresence devices. These may be used in many locations and are always available.

Typical computer, tablet, and smart phone systems provide a two-dimensional display with a camera placed above the display. The device is intended to be used at a distance of less than a meter and the forward facing camera is designed to provide an appropriate field of view. As a result, video conferences using tablets and smart phones present a view of the remote user that is looking down on the user's face from above through an unflattering wide angle lens. The sound and the lighting are often also poor. The two-dimensional presentation through the unflattering lens perspective creates a distance and awkwardness to the conference.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

With the introduction of 3D (Three-Dimensional) video capture and depth imaging sensors on mobile platforms, 2D (Two-Dimensional) video communication may be expected to evolve towards a more immersive experience. Intel RealSense™ technology and sensors provide the 3D imaging that enables such an evolution. In some embodiments a video rendering is made to seem more immersive to the viewer by presenting different viewpoints according to a user interaction state. A sense of eye contact and a flexible visual perspective are provided during a communication with a remote user. A view is synthesized in different ways depending on how the viewer orients a display or on a viewer gaze direction. As a result, a three-dimensional view is implemented on a two-dimensional display. In some embodiments tilting the viewer's screen in any direction is interpreted as a command to show a different perspective of the live video being received. In some embodiments, when eye contact is sought, the head pose of the remote sender is aligned with that of the viewer. A sense of eye contact can be synthesized in real time. In some embodiments, when the remote user looks at a certain object on the screen, the head pose of the remote sender is aligned so that the local user perceives in the communication whether the remote participant is looking at the object.

The immersive effect gives the users some aspects of three-dimensional videoconferencing. This renders the conference more appealing and gives a sense of being more real. More advanced visualization modes and special effects may also be added such as hiding or substituting backgrounds, adding content, providing, augmented reality effects, etc.

Three-dimensional video may be presented even on the two-dimensional displays of mobile devices. When a mobile device has some type of three-dimensional or depth capture capabilities, such as 3D sensors or stereo and multi-camera systems, this device can send more immersive video to other users. While the 3D video might be displayed directly on a 3D display, most devices use simpler 2D displays. Nonetheless many 3D visualizations may be provided to give aspects of live 3D videoconferencing or telepresence.

View synthesis commands may come from the horizontal, vertical or other tilting of a user's display, from the pose and gaze of a person at a remote end, or from the pose and gaze of the person looking at the display locally. Any one or more of these may be communicated as commands to change a view that is synthesized for the other user. These commands may then be conveyed to a view synthesis module to modify a view in real time as commands are received.

Figure 1:
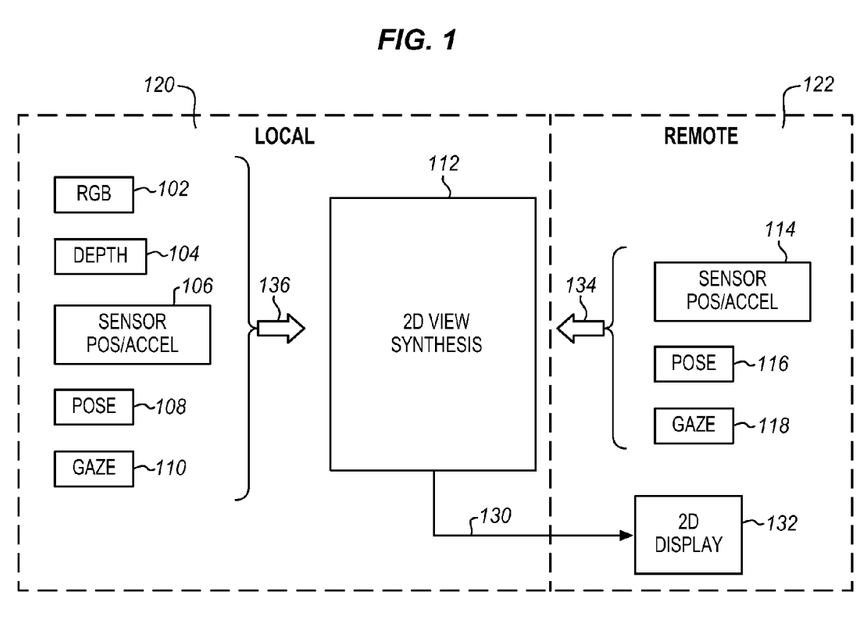
FIG. 1 is a block diagram of a 2D interactive video presentation system according to an embodiment.

FIG. 1 is a block diagram of two devices, a local device 120 and a remote device 122 that may engage in a video exchange. The devices may be connected cameras, smart phones, set top boxes, or any other desired device that allow video to be sent from the local device to the remote device through a remote connection.

The local device has a main camera 102, and a depth sensor 104, such as a secondary camera, or an infrared or laser rangefinder. These components allow a primary video image sequence to be produced with depth information. The depth information may be in the form of a distance or depth associated with each pixel or it may be in the form of a stereo view. The stereo view may be used to provide different perspectives or to determine distances using disparity information. While two image sensors are shown, three or more may be used, depending on the particular implementation.

The local device may also have sensors 106 for position and acceleration and modules to determine pose 108 and gaze 110 for a person in the field of view of the primary or main camera 102. Pose will be used herein primarily to refer to the position of a person's head such as looking down, up, off to the side or tilted, for example. Gaze will be used herein primarily to refer to the direction at which a person's eyes are directed. Pose and gaze are usually but not always the same because a person usually turns his head to follow his eyes.

The local device also has a two-dimensional view synthesis module 112 that receives the video sequence, the depth information and the other information 136 to produce a synthesized 2D view. This 2D view is sent 130 to the remote device 122 and then may be presented on a display 132 of the remote device. The video sequence may also include the sensor, pose, and gaze information. In embodiments, this 2D view may be synthesized using depth image-based rendering (DIBR). However, other techniques may be used instead.

View synthesis based on DIBR may operate using the available image and the depth information to respond to the received interactive dynamic view modification commands. DIBR may be used for example to generate epipolar views or equidistant views around the centroid of the face of the remote participant. The parameters of the dynamic viewpoint are received from the motion sensors or other sensors in the remote device (such as position and motion). The synthesized viewpoint is updated as needed to keep up with the changes in device orientation and gaze direction.

The remote device 122 may also include a position and accelerometer sensor 114, a pose module 116 and a gaze module 118. This information 134 may be sent to the 2D view synthesis 112 from the remote device 122 to the local device 120 so that the local device can adjust the video sequence in response to the information or commands 134 received from the remote device. In this way, the 2D video 130 rendered on the display 132 may be made responsive to commands from the user of the remote device. This creates a more immersive experience that has a three-dimensional feel.

As an example, the user may move the display of the remote device. This movement may be detected by the position sensor 114. The movement is then sent to the local device 2D view synthesis 112. This local device moves the view in response to the command using information from the sensor module 106 that is associated with the video. The change in view in response to the remote user's action provides an immersive feeling of three-dimensionality. In a similar way changes in pose and gaze may be sent from the remote device to the local device to change the 2D view on the display.

The remote device may also use the position and accelerometer information 114 of the remote device as a command to change the 2D view 130 on the 2D display 132. The remote device may also include a camera system to send video to the local device for display on the local device. In this way the devices support a two-way video conference. However, these components are not shown in order to simplify the drawing figure.

The remote device 122 may be implemented using conventional 2D hardware and software commonly available in many smart phones, tablets, and even some notebook and desktop computers. Video conferencing terminals may also be rendered using this approach. The only difference is that the remote terminal is configured to send sensor information to the local device. The video sequence received by the remote device and displayed is a synthesized 2D view for a 2D display. While it changes in response to the commands, the remote device is not required to do anything to support these changes. The remote device simply continues to display the video that it receives. In the described embodiments, the baseline is the 2D view, which gets adjusted or replaced by a synthesized view in response to the commands from the remote that it sends back. The system is described this way for clarity. A synthesized view may alternatively be used for a 2D baseline with appropriate modifications to the adjustments or replacements that are sent.

Figure 2:
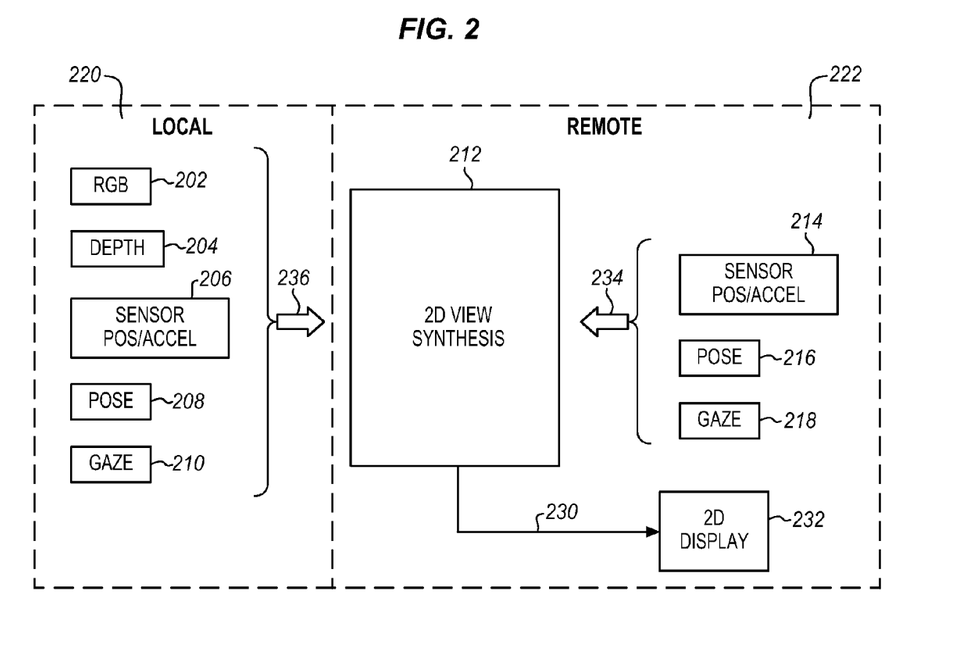
FIG. 2 is a block diagram of an alternative 2D interactive video presentation system according to an embodiment.

On the other hand, the local device may include a depth sensing camera, a 2D view synthesis module and a facility to respond to commands from the remote device and modify the 2D view in response as shown in FIG. 2. The local device may also receive standard 2D or 3D video from the remote device for it to display as the other part of a video conference.

FIG. 2 is a block diagram of a similar connected local device 220 and remote device 222. The local device, as in FIG. 1, includes a primary camera 202 and a depth sensor 204 that produce a video image sequence. The system also has a similar sensor 206, pose 208 and gaze modules 210. This information may be combined with the image sequence and is then sent 236 to a 2D view synthesis module 212 of the remote device 222.

In the example of FIG. 2, the remote device 222 produces a 2D view for the remote device user and renders it on a display 232. The remote device has a position sensor 214, pose module 216, and gaze module 218 which are able to send 234 information and commands to the 2D view synthesis of the remote device. Using the sensor, pose and gaze information from the local device, the remote device is able to apply the sensor, pose and gaze information to the received video to provide a more immersive 2D video experience on the remote display. The changes made by the 2D view synthesis are in part made possible by the sensor information from the local device being included in the video feed 236.

Figure 3:
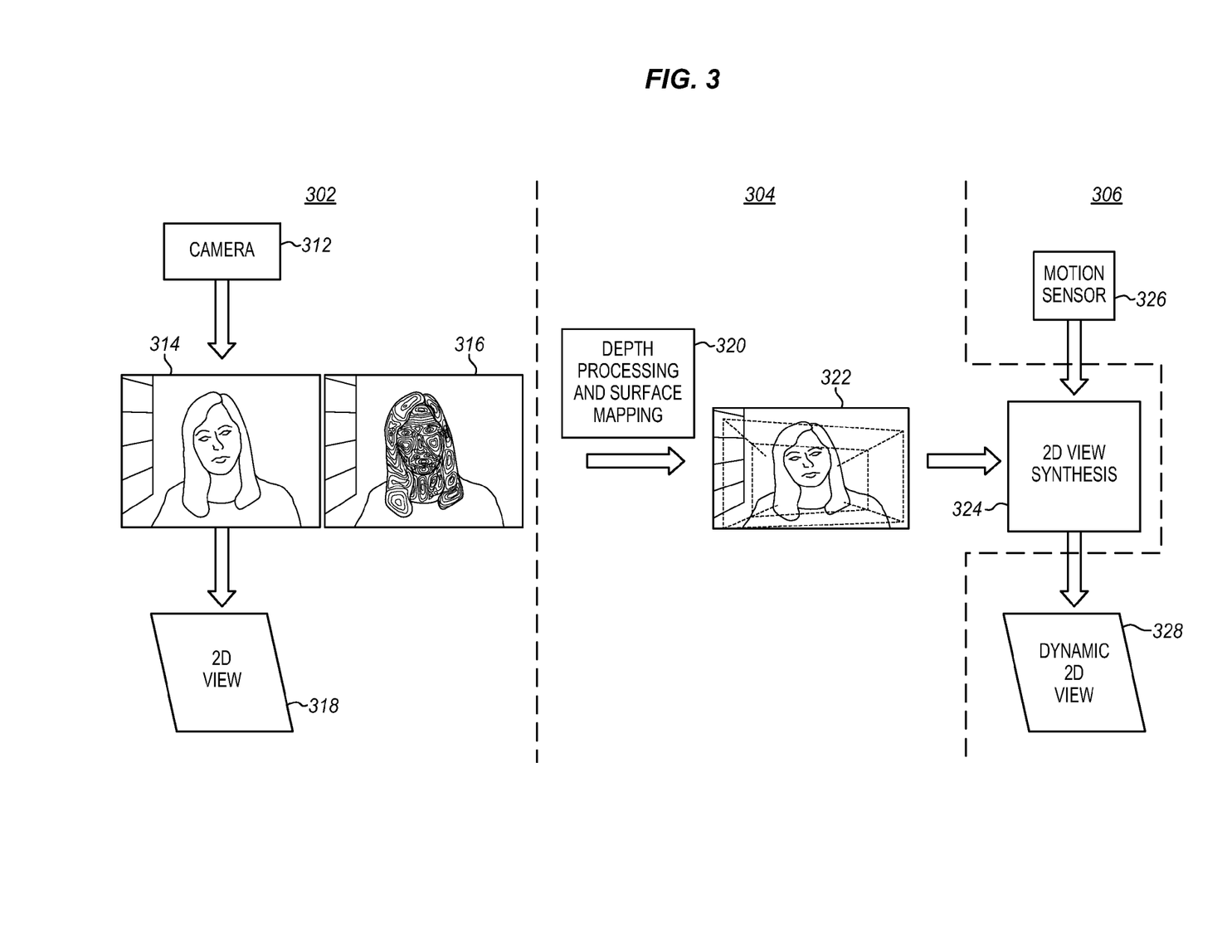
FIG. 3 is a diagram of interactive video capture, processing, and display through three-domain according to an embodiment.

FIG. 3 is a functional diagram of interactive viewing as described above for one direction of a video conversation. There are three-domains in FIG. 3. The first domain 302 is for the local device. The third domain 306 is for the remote device and the second domain 304 between the two may be a part of either the local device or the remote device.

The local device includes a depth sensing camera 312. This depth sensing camera may be any camera array or any combination of RGB imagers and depth sensing devices. Depending on the nature of the camera, it may produce several different types of view. The camera may include processing or the images may be processed in another component. In this example, the camera produces a conventional 2D image 314 and a depth surface 316. The depth surface provides depth information for each pixel of the 2D image. The depth information may be coarser so that the depth information may have fewer pixels, but each pixel of the 2D image may have an assigned depth. As mentioned above, the depth may come from a second image sensor, an infrared projector, a laser rangefinder, a radar system, or any of a variety of other types of sensors.

The 2D view may be presented locally on a display 318. The display 318 for the local device may also be used to present video from the remote device. The combined 2D image and depth surface may then be provided for depth processing and surface mapping 320 to generate a 3D surface 322 based on the 2D view. This 3D surface may also be presented on the local display 318 if the display is suitably equipped to show 3D surfaces. The 3D surface may be generated by either the first domain 302 or the second domain 304.

The 3D surface is provided to a 2D view synthesis module 324. This module is in the second domain 304 and may be part of either device. It uses the 3D surface and receives input from a motion sensor 326 to render a 2D view 328 of the 3D surface 322. The 2D view may be dynamic based on input from the motion sensor so that with different inputs, the 2D view is changed based on the inputs. The 2D view 328 is therefore dynamic and provides a new level of interaction for the user of the third domain device. Each time the motion sensor detects motion, the 2D view is changed. This may be done as far as the 3D surface allows. When the motion exceeds the range of the 3D surface, then no interaction is presented.

While a motion sensor is shown, other sensors may be used instead or in addition. The remote device may track the position of a user's head and as the user moves the head to one side or the other side of the screen, the 2D view synthesis may present a different view. This gives the impression of seeing the sides of an object in the image by moving the head to the side. Similarly, the user's head pose may be tracked. As the user turns the head side to side and up and down, the 2D view synthesis may present a different view. This may also be used to give the impression of seeing an object from different perspectives by changing head pose. In the same way a user's gaze may be tracked. By monitoring eye position, different views may be presented as the user looks in different directions. All of this sensor data may be combined to provide view changes in response to user head position, pose, and gaze together. The sensor information at both local and remote sites may also be used to compensate for environmental factors such as motion by stabilizing the synthesized view. This may be done using the described hardware and communications and further improves the user experience.

As shown in the functional diagram of FIG. 3, at any given time, the remote user display 328 may be showing a 2D image. However, it is dynamic as it is a 2D view synthesized using depth image based rendering (DIBR), or any other applicable view synthesis algorithm, using one or more available images with depth and 3 or more additional sources of information from the remote device. This information may include the display orientation provide by data from device position sensors, and a general gaze direction.

In addition, a special case may be provided when eye contact is intended by the participants. In many portable and lower cost devices, the primary camera is in a different position from the screen. For many smart phones, tablets, and computers, the primary camera is placed directly over the center of the display. As a result, in a typical video conference using such devices, the user looks at the display and the camera observes the user from above the display. This creates the impression from the perspective of the camera that the user is looking down and not at the remote user. While the user may provide a more pleasing view for the remote user by looking directly into the camera rather than at the screen, this has the effect that the user can no longer look at the display. While an appearance of eye contact is provided, no real eye contact is present. This looking down phenomenon may be detected by a variety of mechanisms, such as the pose modules 108, 208 or gaze modules 110, 210. The 2D view synthesis module 112, 212 may then use the depth or stereo image information to rotate the user's head upwards when synthesizing a 2D view, compensating for the position of the camera.

The system may also be configured to determine if two users to a conference are attempting to establish eye contact. If the cameras are located in the center of the corresponding display then eye contact may be established when both users look directly into the center of the display. However, when one or both camera are located above or below the display, then the more a user looks into the center of the screen, the more they will be looking away from the camera and appear to be looking away from the other user. The two systems may track gaze to determine when both users are simultaneously looking into the center of the display or some other selected location and then determine that the users are trying to establish eye contact. This may be sent as a command to the 2D view synthesis for both systems. The 2D view synthesis may then rotate the view of both heads using the 3D surface so that both heads appear to be looking at the position of the other user's eyes.

A more accurate eye contact may be performed by knowing the geometry of the system, for example the camera position with respect to the display and the display size at each end of the call. While eye contact may be determined simply be detecting whether a user's gaze is aimed at the center of the screen, more accurate methods may be used based on the face and eye location of the other participant in the call. The user's gaze is then compared to the other participant's gaze.

Figure 4:
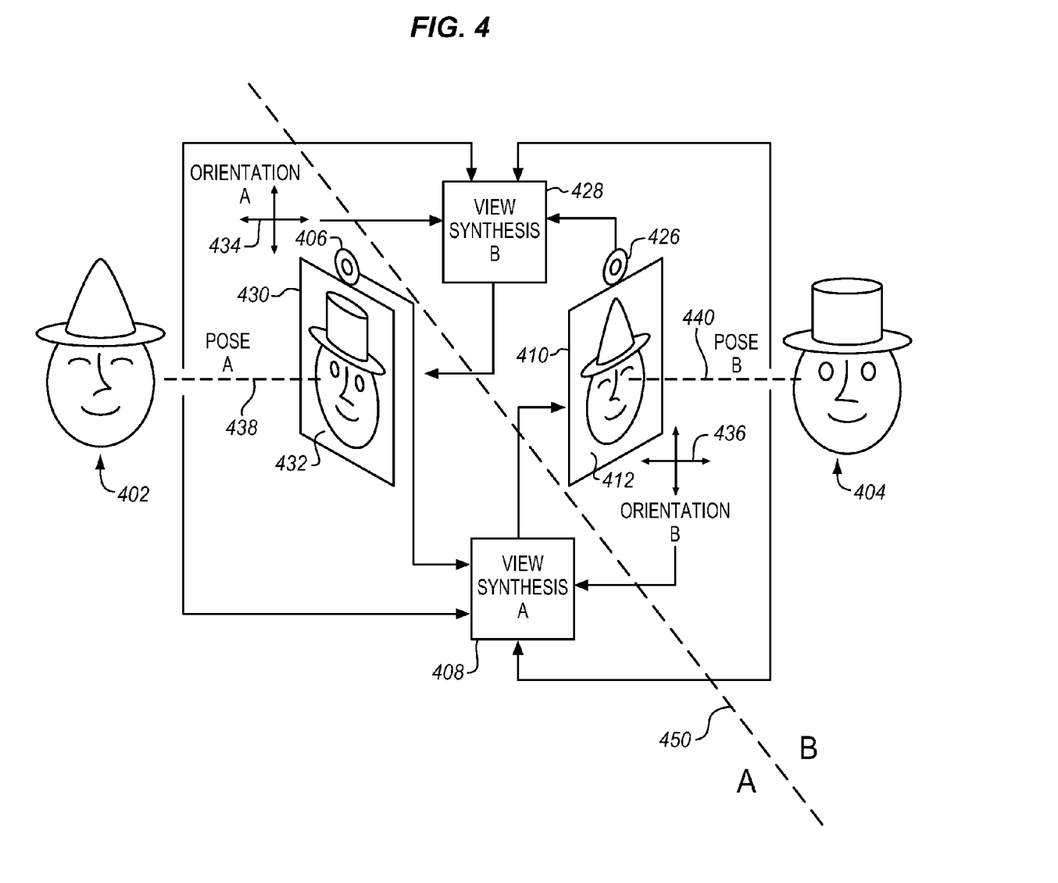
FIG. 4 is a data flow diagram of reciprocal two-way interactive video presentation according to an embodiment.

FIG. 4 is an alternative data flow diagram to show the communication of scenes with pose between two different devices with two different users. A first user 402 has a first device 430. The first user is observed in a camera system 406 of the first device and the observed image is sent to a view synthesis module 408. Similarly, the second user 404 has a device 410 with a camera array 426 so that the scene of the second user is captured by the camera array associated with his device and sent to a second view synthesis module 428. This may be the same as the first view synthesis module 408 or a different module 428 as shown.

The first device 430 has an orientation sensor 434 that sends orientation information to the second view synthesis module 428. The second device 410 is able to determine a pose 440 of the second user 404 using the camera system 426. This information may all be used by the second view synthesis module 428 to determine a view 412 for display on the second device 410. This view may be modified repeatedly based on orientation, pose and other information that may be communicated between the devices. In a similar way, the second device 432 has an orientation sensor 436 that sends orientation information to the first view synthesis module 408. The first device 403 is also able to determine a pose 438 of the first user 402 using the camera system 406. This information may all be used by the first view synthesis module 408 to determine a view 432 for display on the first device 430. In this way, two similar devices may each provide the same experience to the two users. The first user 402 sees an immersive view 432 of the second user 404 which may be modified using the orientation sensor 434 and pose 440 or by any other available input. Similarly the second user 404 sees an immersive view 412 of the first user 402.

FIG. 4 shows that the two users 402 and 404 are facing their respective displays. However, the cameras 406, 426 are not in the displays but above the displays. As a result, the normal view from the camera will be a view from above with the user looking down. However, comparing the view of the right user 404 as rendered on the left display 430, the image 432 is not from above. This shows that the system can determine the right user's gaze or pose with respect to the display. This is then rendered at the other end instead of the view from the camera. The pose is determined with respect to the user's own display and then this information is provided to the view synthesis module to rotate the view of the user's head accordingly. While an upward rotation is shown, the rotation may be in other directions and other camera positions may be compensated.

In this data flow diagram, the data flow between cameras, sensors, view synthesis modules and other components is shown more directly. As suggested by the diagram there is a division line 450 between the hardware of the first device 430 on the left and the hardware of the second device 410 on the right. This dividing line may be modified to suit different implementations. As an example, both view synthesis modules may be on one or the other of the two devices. The separation line 450 may be rotated to various amounts to show how the various components may be present on one device or the other. A benefit of this flexible approach is that on user may receive the benefits of the immersive view without having any 3D equipment on that user's device. All of the processing may be done on the other user's device. As an example, if device A performs view synthesis locally, then device B can receive the synthesized view, but if device B does not have local view synthesis it sends regular 2D video back to A.

Figure 5:
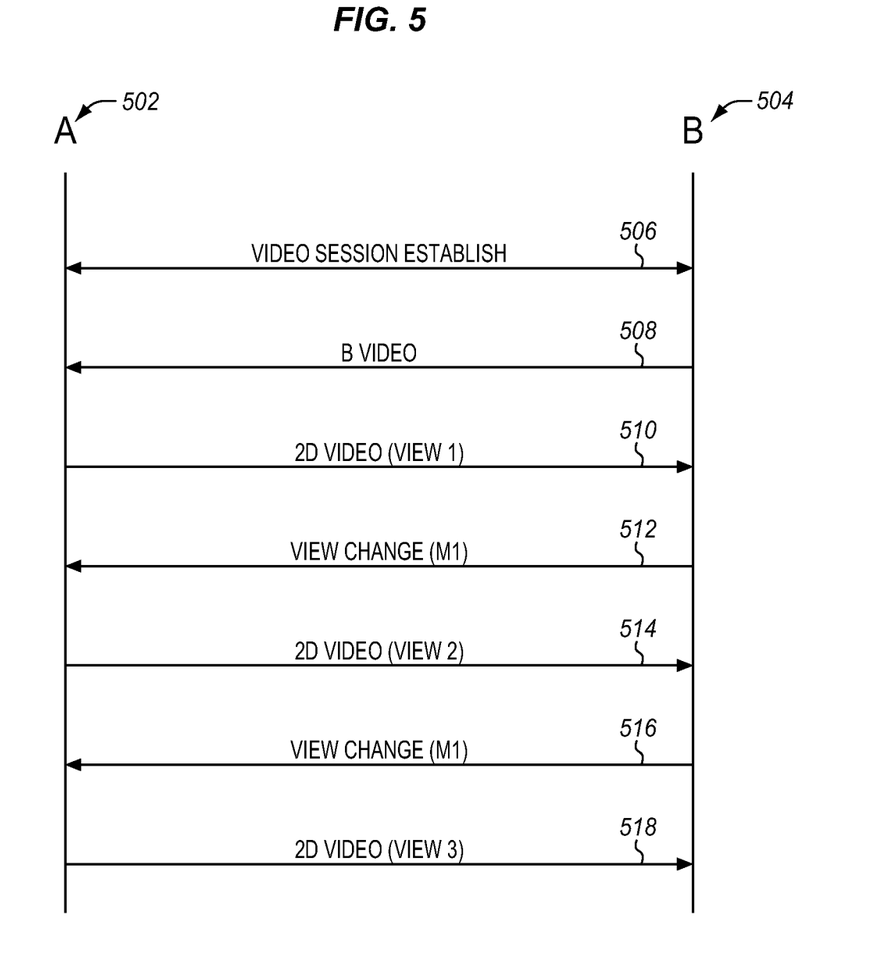
FIG. 5 is a data transmission diagram of presenting 2D interactive video on a remote display according to an embodiment.

FIG. 5 is a data transmission diagram of some of the principles described above. In this example, the scene at a Device A is being visualized at Device A. Sensor and pose information updates are sent from Device B to Device A so that Device A can modify the visualization that it sends to Device B. The scene at Device B is also being visualized at Device A and a similar visualization may be performed in the reciprocal direction as shown in FIG. 4, but this is not shown in the drawing figure. Device A 502 is in a communication session with device B 504. In this example, device A is shown as having the 3D surface capabilities, however, device B may also have these capabilities and a similar type of signaling from device A may be used to modify the view provided by device B to device A. At 506 a video session is established. As described herein, this session is a two-way video teleconference, however embodiments are not so limited. The video session may be established in any of a variety of different ways depending on the nature of the devices and the communication link and protocols between them.

At 508 device B sends video to device A in accordance with the session. At the same time device A sends 2D video to device B. These videos are displayed on the respective receiving device for the benefit of the users. At 512 device B sends a command to device A to change the view of the 2D video from the original view (view 1) to another view (view 2). This command may be from a motion sensor, pose module, gaze module, or another module or a combination of modules. Commands may also be generated by a manual interface for example by touch gestures on a display, on a pointing device, or trackpad, by keyboard operation or by some other user gesture system.

At 514 device A modified the view in response to the command and sends video with a different view (view 2) to device B. This sequence may be repeated throughout the session as often and as quickly as desired by the user of device B. One additional command is shown at 516, from device B to device A, to change the view again and again at 518, device A changes the view to another view (view 3). These changes in the view provide an interactive and immersive nature to the 2D video displayed on device B. In the same way, commands may be sent to device B from device A to change the view of the video. The resulting video is sent 508 to device A in response.

Figure 6:
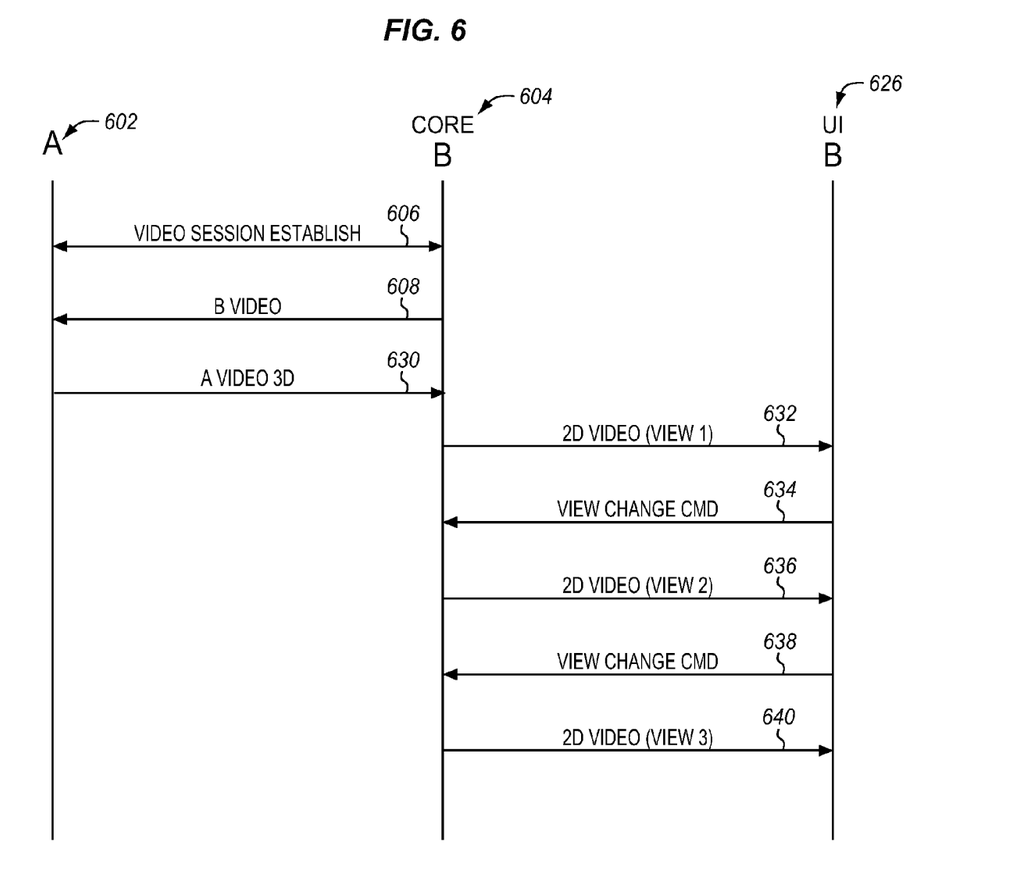
FIG. 6 is a data transmission diagram of presenting 2D interactive video on a remote display according to another embodiment.

FIG. 6 is another data transmission diagram of some of the principles described above as represented in part in FIG. 2. In this example, the scene at Device A is being visualized at Device B. Sensor and pose information updates are not sent from Device B but are used locally so that Device B can modify the visualization that it receives to Device A. The scene at Device B is also being visualized at Device A and a similar visualization may be performed in the reciprocal direction either at Device B or at Device A or both as shown in FIG. 4, but this is not shown in the drawing figure. Device A 602 establishes communication session with device B 604 at 606. In this example, device B is shown as having the View Synthesis capabilities. Device B is shown in two parts. The left side part is the primary computing, graphics, and communication part. The right side part 626 is the user interface portion with display, input devices, motion sensors, gesture and user movement tracking etc. According to the established video session device B sends 2D or 3D video to device A at 608. Similarly, device A sends 3D video to device B at 630. This 3D video includes depth information and may also include other sensor information as discussed above. With these two video streams the session is established The processing and communications core 604 of device B takes the 3D video received from device A and renders it as a 2D video with a particular selected view. This video is sent at 632 to the user interface of device B for display. When the user at device B desires an interaction with the video, a command is generated at the device B UI. The generated command is sent at 634 to the device B core to change the view of the 2D video from the original view (view 1) to another view (view 2). At 636 the device B core modifies the view in response to the command and sends video with a different view (view 2) to device B UI. This sequence may be repeated throughout the session as often and as quickly as desired by the user of device B. One additional command is shown at 638 from device B UI to device B core to change the view again and, again at 640, device B core changes the view to another view (view 3). These changes in the view provide an interactive and immersive nature to the 2D video displayed on device B. The repetition and interaction may occur in the same way as in the example of FIG. 4.

Figure 7:
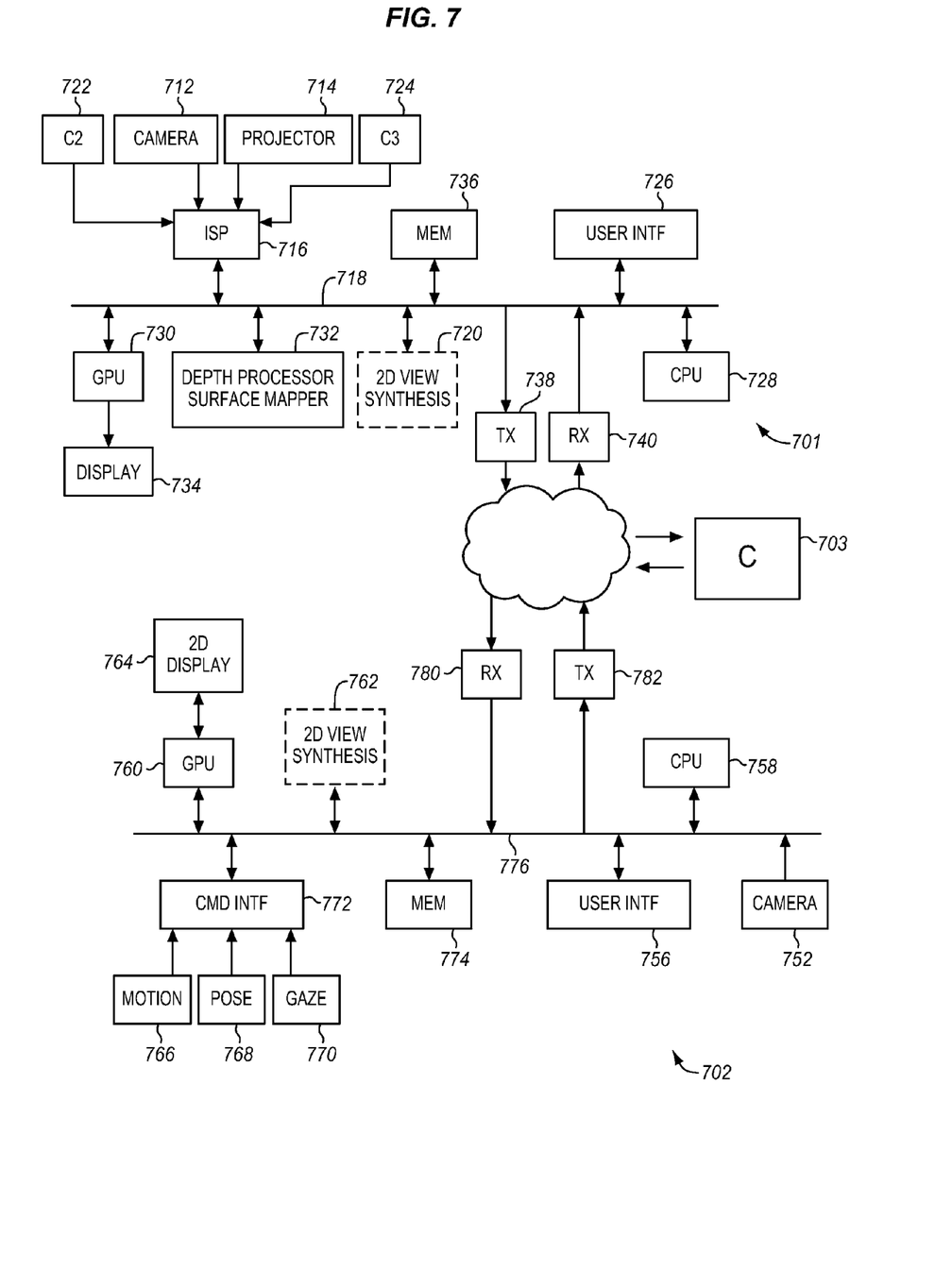
FIG. 7 is a hardware block diagram for first and second devices for presenting 2D interactive video from one device on another device according to an embodiment.

FIG. 7 is a more detailed hardware block diagram of a first 701, second 702, and possible additional devices 703 suitable for use in the interactions, operations and functions described above. In this example the first device 701 is configure to generate 3D images or 2D images with associated depth, distance, or texture maps. The first device 701 is shown as having a camera 712 and a depth sensor. These sensors are coupled to an image signal processor (ISP) 716. As mentioned above, the camera and depth sensor are provided as one example. A 3D camera system with multiple imaging sensors, a camera and rangefinder system, or combination of any of these systems or other systems may be used to generate the 3D video.

As shown in this example, there is a primary image sensor 712 to capture high resolution images. This is augmented by a second lower resolution infrared image sensor 722 on one side of the primary sensor and a third lower resolution infrared image sensor 724 on the other side of the primary sensor. A laser infrared projector 714 provides infrared illumination as desired in order to illuminate the view for the infrared image sensor. There may also be visible light projectors or lamps to illuminate the view for the primary camera. This depth sensing camera system with ISP corresponds approximately to Intel® RealSense™ 3D technology. This allows software calls and application programming interfaces (APIs) for the RealSense™ drivers to be used to implement many of the functions described herein. However, many different camera systems may be used depending on the desired video results and the communications interface available. The ISP takes the raw image data and generates video sequences, depth information, image disparity information and any other desired information. The ISP may also provide compression, format conversion and other functions, depending on the particular implementation.

The ISP is coupled to a system bus 718 for communication with memory 736, a central processor (CPU) 728, a graphics processor (GPU) 730 and any other desired components. The first device also has a user interface 726 coupled to the bus 718 to allow the user to provide commands to establish video sessions, send video, control the cameras and other sensors. The graphics processor is coupled to a display 734 to show video or images from the ISP as well as from the other devices. The device includes a transmit interface 738 and a receive interface 740. These may be consolidated into the same component and there may be multiple transmit and receive interfaces to support different communication interfaces. These interfaces are shown as coupled to other devices through a cloud. This cloud is not limited to the Internet but may represent any near field, local, metropolitan, wide area wired or wireless network or communications interface.

The first device includes a depth processor and surface mapper. This may be implemented as a separate hardware module as shown or within the ISP, graphics processor or central processor, or another component. This module is able to take the image information of the video sequence and generate a 3D surface for internal use or consumption.

The second device 702 similarly has a camera 752 with or without additional sensors and an ISP coupled to a system bus 776. A user interface 756 is also coupled to the bus and interacts with a CPU 758, memory 774 and GPU 760. The GPU is coupled to a display 764 to present local video or images as well as video from the first and any other devices.

The second device has a command interface 772 coupled to the system bus 776 to provide commands regarding the video as described above. Accordingly a motion sensor 766, pose sensor 768, and gaze sensor 770 are all coupled to the command interface so that this information may be provided to the CPU. Additional commands may be provided by the user interface 756 or the system may use only user interface commands, such as touchscreen, mouse, keyboard and similar types of inputs. The pose and gaze sensor may be implemented using the camera 752 or another sensor together with computing blocks that create pose and gaze from the sensors and the geometry of the system, i.e. camera location with respect to the display and display size.

The second device is also coupled to the communications interface by a receive interface 780 and a transmit interface 782. The third device 703 may be similar to either the first or second device or have aspects of both and include unique components. There may be multiple third devices for multiple party video communication sessions.

The first and second devices are shown as different, however, both devices may have each component shown for the two devices. In use, the first device 701, after establishing a video communications session with the second 702 and one or more third devices 703 generates depth or 3D video using the camera 712, 714 and ISP 716 system. This video is processed for depth and surface 732 to generate a video sequence of 3D surfaces.

In one embodiment, the 3D surface is sent through the transmitter 738 to the receiver of the second and any other devices through the communications interface. The second device receives the video depth surface through its receive interface 780 and then generates a 2D view using an optional 2D view synthesis module 762. This module may be a discrete component or incorporated into the CPU, GPU or another component. The 2D view is rendered by the GPU 760 and presented on the display 764 as a 2D video image sequence. The second device can receive commands from the user interface or the command interface to alter the view and then the 2D view synthesis may alter the view accordingly. The altered view will be presented on the display through the GPU. By altering the view directly on the second device, the second device is able to quickly respond to user commands.

In another embodiment, the video sequence of 3D surfaces from the depth processor and surface mapper 732 is provided to an optional 2D image synthesis module 720 of the first device into a 2D video image sequence. This is sent to the second device and any other devices through the transmitter 738. The second device receives this 2D video and renders it in the GPU 760 for the display 764. The command interface and user interface then generate commands which are sent by the CPU through the second device transmitter 782 to the first device receiver 740 to alter the 2D view. The first device makes the changes in the 2D view synthesis and continues to send 2D video to the second device through the transmitter. The 2D view is altered as commands are received from the second device. By altering the view on the first device, the second device requires no 3D components in order to provide an immersive and dynamic 3D view. In addition, the video transmitted from the first device has only 2D information and so it can be transmitted using fewer bits.

The illustrated example contemplates that the second device captures a simple 2D video sequence in its camera 752. This video is processed in the CPU or the GPU or a separate ISP or other processor and then sent through the transmit interface to the first 701 and any other devices 703. The first device receives this video through its receive interface and renders it on its display 734 through its GPU 730. However, the second device may be configured in a manner similar to the first device to generate and render interactive 2D video for a dynamic view on the first device.

The 3D video may be transmitted in any desired way, depending on the video quality and the communications interface. Broadcast and transmission standards have been established for 3D video. Alternatively, there is a 3DZ Tile format that provides some depth information with less data than genuine 3D video. The data may also be sent as 2D video plus metadata to carry the depth information. This requires even less data.

Figure 8:
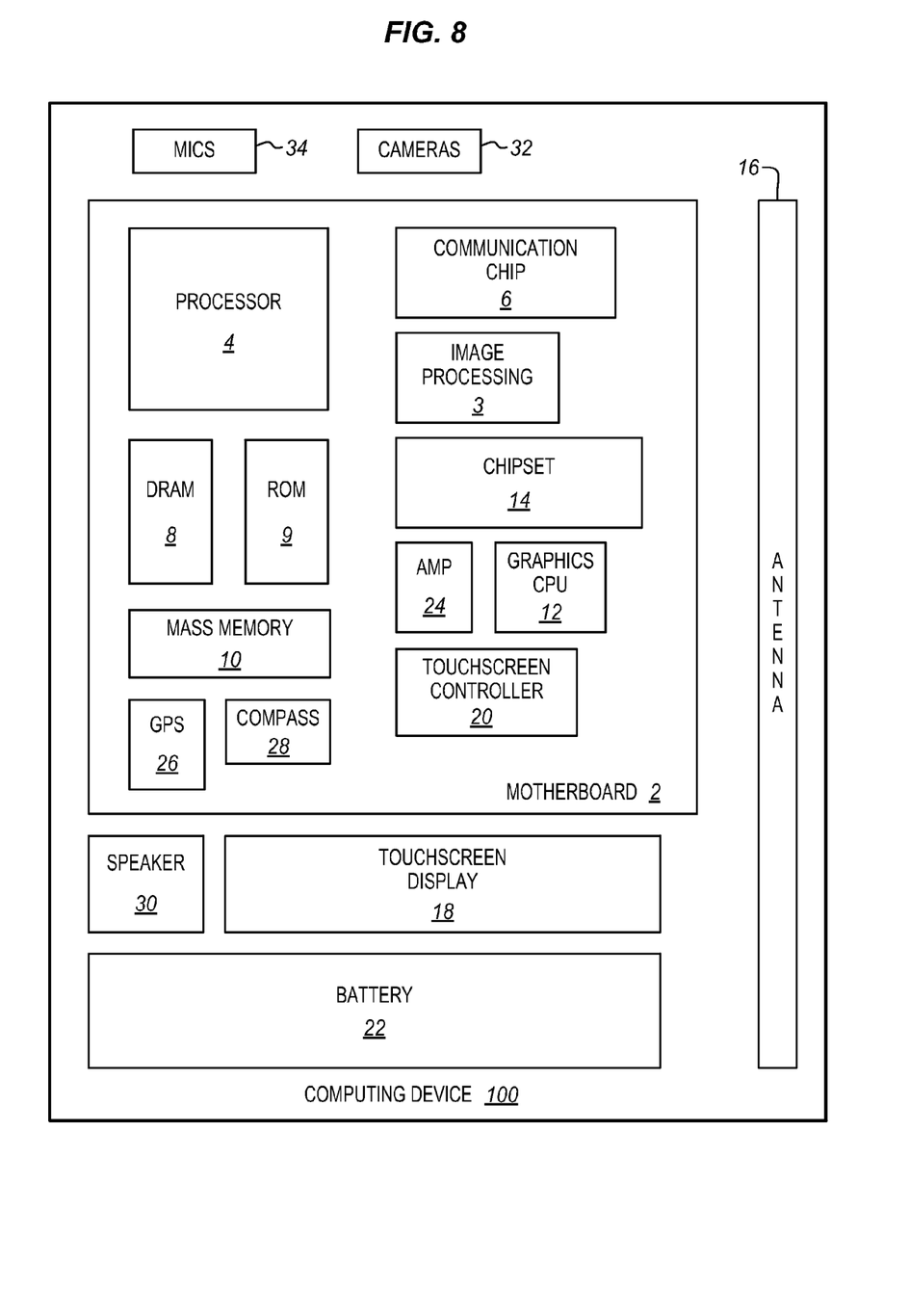
FIG. 8 is a block diagram of a computing device incorporating interactive video presentation according to an embodiment.

FIG. 8 is a block diagram of a single computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS)

device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 are coupled to an image processing chip 3 to perform format conversion, coding and decoding, noise reduction and 3D mapping as described herein. The processor 4 is coupled to the image processing chip to drive the processes, set parameters, etc.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes synthesizing a two-dimensional (2D) video sequence in real time with a first view from a video image sequence with depth captured by a first device, providing the 2D video sequence with the first view to a second device in real time, receiving a command from the second device to change a view of the 2D video sequence as the video sequence is rendered, changing the view of the 2D video sequence as it is rendered to a 2D video sequence with a second view, and providing the 2D video sequence with the second view to the second device in real time.

Further embodiments include capturing the video image sequence with depth in real time at the first device using a camera system at the first device and wherein synthesizing the 2D video sequence and the changing the view of the 2D video sequence are performed at the first device.

In further embodiments providing the 2D video sequence with the first and the second view comprises sending the 2D video sequence from the first device to the second device.

In further embodiments synthesizing a 2D video sequence with the first and the second view comprise synthesizing at the second device, the method further comprising displaying the 2D video sequence with the first and the second view on the second device.

Further embodiments include receiving a command from a user to change a view of the 2D video sequence at a user interface of the second device and wherein receiving a command comprises receiving the command from the user interface.

Further embodiments include receiving the 2D video sequence in real time from the first device at the second device before synthesizing the 2D video sequence with the first and the second view.

In further embodiments synthesizing comprises synthesizing at the first device, and wherein changing the view comprises changing the view at the first device, the method further comprising sending the 2D video sequence with the first view and sending the 2D video sequence with the second view to the second device in real time.

Further embodiments include establishing a video session with the second device before sending the 2D video sequence to the second device.

In further embodiments the video session is a video conference call.

In further embodiments synthesizing the 2D view comprises depth processing and surface mapping the video image sequence with depth.

In further embodiments receiving a command comprises receiving a command to rotate a view based on movement of a user's gaze on the second device detected by a motion sensor.

In further embodiments synthesizing a 2D video sequence with a first view comprises synthesizing a sequence rotated upward to compensate for a position of a camera system of the first device.

In further embodiments capturing the video image sequence with depth comprises capturing a stereo video image sequence.

In further embodiments capturing the video image sequence with depth comprises capturing a primary video sequence and a depth map using a rangefinder.

Some embodiments pertain to an apparatus that includes a camera system to capture a video image sequence with depth in real time, a view synthesis module to synthesize a two-dimensional (2D) video sequence in real time with a first view from the video image sequence with depth, a transmit interface to send the 2D video sequence with the first view to a remote device for rendering on the remote device, a receive interface to receive a command from the remote device to change a view of the 2D video sequence as the video sequence is rendered, the view synthesis module to change the view of the sequence as it is rendered to a 2D video sequence with a second view in response to the received command, and the transmit interface to send the 2D video sequence with the second view to the remote device for rendering on the remote device.

In further embodiments the received command comprises a command to rotate a view based on rotation of the remote device detected by a motion sensor of the remote device.

Further embodiments include a pose estimator to determine a user's pose with respect to a display and to provide this information to the view synthesis module to rotate the user's head based on the pose with respect to the display.

Some embodiments pertain to a system that includes a system board, a camera system coupled to the system board to capture a video image sequence with depth in real time, an image signal processor coupled to the system board to receive the video image sequence from the camera system and to synthesize a two-dimensional (2D) video sequence in real time with a first view from the video image sequence with depth, and a communications interface to send the 2D video sequence with the first view to a remote device for rendering on the remote device and to receive a command from the remote device to change a view of the 2D video sequence as the video sequence is rendered, wherein the image signal processor is further to change the view of the sequence as it is rendered to a 2D video sequence with a second view in response to the received command and the communications interface is further to send the 2D video sequence with the second view to the remote device for rendering on the remote device.

Further embodiments include a command interface coupled to the system board to receive a user command to change a view of the 2D video sequence as the video sequence is rendered.

Further embodiments include a motion sensor coupled to the system board and wherein the image signal processor compensates the 2D video sequence for motion detected by the motion sensor.

What is claimed is:

1. A method comprising:
receiving from a first device a video sequence with depth, motion, and pose information;
synthesizing a two-dimensional (2D) video sequence with a first view from the received video image sequence using the depth, motion, and pose information and depth image-based rendering;
providing the 2D video sequence with the first view to a second device;
receiving a detection of motion from a motion sensor of the first device;
changing the view of the 2D video sequence as it is rendered based on the detected motion;
receiving a command from the second device to change a view of the 2D video sequence as the video sequence is rendered;
changing the view of the 2D video sequence as it is rendered to a 2D video sequence with a second view; and
providing the 2D video sequence with the second view to the second device.

2. The method of claim 1, further comprising capturing the video image sequence with depth in real time at the first device using a camera system at the first device and wherein synthesizing the 2D video sequence and the changing the view of the 2D video sequence are performed at the first device.

3. The method of claim 2, wherein providing the 2D video sequence with the first and the second view comprises sending the 2D video sequence from the first device to the second device.

4. The method of claim 1, wherein synthesizing a 2D video sequence with the first and the second view comprise synthesizing at the second device, the method further comprising displaying the 2D video sequence with the first and the second view on the second device.

5. The method of claim 4, further comprising receiving a command from a user to change a view of the 2D video sequence at a user interface of the second device and wherein receiving a command comprises receiving the command from the user interface.

6. The method of claim 5, further comprising receiving the 2D video sequence in real time from the first device at the second device before synthesizing the 2D video sequence with the first and the second view.

7. The method of claim 1, wherein synthesizing comprises synthesizing at the first device, and wherein changing the view comprises changing the view at the first device, the method further comprising sending the 2D video sequence with the first view and sending the 2D video sequence with the second view to the second device in real time.

8. The method of claim 7, further comprising establishing a video session with the second device before sending the 2D video sequence to the second device.

9. The method of claim 8, wherein the video session is a video conference call.

10. The method of claim 1, wherein synthesizing the 2D view comprises depth processing and surface mapping the video image sequence with depth.

11. The method of claim 1, wherein receiving a command comprises receiving a command to rotate a view based on movement of a user's gaze on the second device detected by a motion sensor.

12. The method of claim 1, wherein synthesizing a 2D video sequence with a first view comprises synthesizing a sequence rotated upward to compensate for a position of a camera system of the first device.

13. The method of claim 1, wherein capturing the video image sequence with depth comprises capturing a stereo video image sequence.

14. The method of claim 1, wherein capturing the video image sequence with depth comprises capturing a primary video sequence and a depth map using a rangefinder.

15. An apparatus comprising:
a camera system to capture a video image sequence with depth;
a pose estimator to determine a user's pose with respect to the camera system;
a motion sensor associated with the camera system to detect motion of the camera system;
a view synthesis module coupled to the camera system, the pose estimator, and the motion sensor to synthesize a two-dimensional (2D) video sequence with a first view from the video image sequence using the depth, motion, and pose information;
the view synthesis module further to receive a detection of motion from the motion sensor and to change the view of the 2D video sequence as it is rendered based on the detected motion;
a transmit interface to send the 2D video sequence with the first view to a remote device for rendering on the remote device;
a receive interface to receive a command from the remote device to change a view of the 2D video sequence as the video sequence is rendered;
the view synthesis module to change the view of the sequence as it is rendered to a 2D video sequence with a second view in response to the received command; and
the transmit interface to send the 2D video sequence with the second view to the remote device for rendering on the remote device.

16. The apparatus of claim 15, wherein the received command comprises a command to rotate a view based on rotation of the remote device detected by a motion sensor of the remote device.

17. The apparatus of claim 15, wherein the pose estimator provides pose information to the view synthesis module to rotate a user's head based on the pose information with respect to a display.

18. A system comprising:
a system board;
a camera system coupled to the system board to capture a video image sequence with depth information;
a motion sensor coupled to the system board to determine motion of the camera system;
an image signal processor coupled to the system board to receive the video image sequence from the camera system to determine pose information and to synthesize a two-dimensional (2D) video sequence with a first view from the video image sequence using the depth, motion, and pose information the image signal processor further to receive a detection of motion from the motion sensor and to change the view of the 2D video sequence as it is rendered based on the detected motion; and
a communications interface to send the 2D video sequence with the first view to a remote device for rendering on the remote device and to receive a command from the remote device to change a view of the 2D video sequence as the video sequence is rendered,
wherein the image signal processor is further to change the view of the sequence as it is rendered to a 2D video sequence with a second view in response to the received command and the communications interface is further to send the 2D video sequence with the second view to the remote device for rendering on the remote device.

19. The system of claim 18, further comprising a command interface coupled to the system board to receive a user command to change a view of the 2D video sequence as the video sequence is rendered.

20. The system of claim 18, wherein the image signal processor compensates the 2D video sequence for motion detected by the motion sensor.

* * * * *